May 11, 1954　　　　J. W. DURHAM　　　　2,678,155
COMPRESSOR-EXPANDER

Filed May 25, 1948　　　　　　　　　　　　5 Sheets-Sheet 1

Fig. 1.

Junius W. Durham
INVENTOR.

BY *Clarence A. O'Brien*
*and Harvey B. Jacobson*
Attorneys

May 11, 1954 — J. W. DURHAM — 2,678,155
COMPRESSOR-EXPANDER
Filed May 25, 1948 — 5 Sheets-Sheet 2

Junius W. Durham
INVENTOR.

May 11, 1954

J. W. DURHAM

2,678,155

COMPRESSOR-EXPANDER

Filed May 25, 1948

Junius W. Durham
INVENTOR.

BY

May 11, 1954 J. W. DURHAM 2,678,155
COMPRESSOR-EXPANDER

Filed May 25, 1948 5 Sheets-Sheet 4

Junius W. Durham
INVENTOR.

May 11, 1954 J. W. DURHAM 2,678,155
COMPRESSOR-EXPANDER
Filed May 25, 1948 5 Sheets-Sheet 5

Junius W. Durham
INVENTOR.

Patented May 11, 1954

2,678,155

UNITED STATES PATENT OFFICE 2,678,155

COMPRESSOR-EXPANDER

Junius W. Durham, Montgomery, Ala., assignor of one-half to Durmorstan Company, Incorporated, Montgomery, Ala.

Application May 25, 1948, Serial No. 29,075

3 Claims. (Cl. 230—144)

This invention relates to a compressor and/or expander for use as a refrigerating unit, as a compressor per se, as a rotary internal combustion engine, with or without ignition, or as a fluid motor and the like. The primary object of this invention is to get a piston effect with a simplified rotary movement.

Another object of this invention is to obtain a compression and expansion in the same rotary path in contradistinction to the reciprocating path provided by the conventional piston action. The advantage of such a system resides in a more complete utilization of the energy input, since no energy is lost in the reversal of the direction of the moving masses of the system.

A still further object of this invention is to employ air as a direct refrigerant and air-conditioning agent with the resultant elimination of evaporator and condenser coils and chemical agents which must be confined to the refrigerating equipment.

Yet another object of this invention is to introduce liquid for absorbing heat of compression in such manner that the liquid is dispersed fairly evenly in the form generally of a spray across the path of the moving masses. This may be accomplished in several novel ways. Firstly, the liquid may be sprayed into the rotary compressor and expander by means of jets. Secondly, the liquid may be introduced through a hollow shaft under pressure substantially at the center of rotation, which liquid will be expelled by the combined centrifugal action and pressure at the source. A slight escape of compressed gases in the compressor will assist in spraying the liquid across the path of the moving masses. The center of the mass of the rotating gases will be caused to follow a spiral path generally at a fixed distance from the center of rotation while the heavier liquid particles carried along with the gases will move in an increasing spiral path outwardly toward the walls of the compressor and expander.

A still further object of the invention is to provide an automatic actuating and timing means of relatively simple construction whereby the compression is sinusoidally varied in intensity while the expansion is simultaneously varied, both the compression and expansion phases being cyclically repeated at a more or less constant velocity equivalent to the velocity of rotation of the compressor and expander. Each cycle is double acting whereby two compressions and two expansions are effected per unit of rotation of the compressor and expander.

Another object of this invention is to provide a means for effecting cyclical compression and expansion comprising three independently rotatable systems about two axes, one eccentric to the other, only one of which systems is positively driven about one of the axes.

Still another object of this invention is to provide a rotary system which can alternately be employed as a compressor per se or as a refrigeration unit after some slight modifications are made.

Yet another object of this invention is to obtain a greater volume of compressed gases with a use of relatively few moving parts at a high rate of cyclical repetition, thus effecting a much needed economy in the field of compression and refrigeration.

A still further object of this invention is to provide an apparatus for use as a reciprocating and rotary internal combustion engine which produces a greater economical power output than presently known rotary or reciprocating engines.

A particular feature of this invention is the provision of a plurality of sectoral tanks rotationally disposed and internally positioned within a stator tank which forms an essential portion of the compressor and expander. It is to be understood that with some modified uses of this invention, the stator is not an essential portion of this invention and may be eliminated from such modifications. In such modifications, only a suitable skeleton framework will be required to support the sectoral tanks.

Another feature of this invention is the provision of a plurality of blades or oscillatory free plates semi-independently rotatable within the stator tank whereby approach of a blade to one face of a sectoral tank causes compression at that face, while recession from the face of the sectoral tank causes suction of gases within the stator tank at or approximate to that same face. As the blade recedes from one face of a sectoral tank causing suction thereabout, it approaches the face of another sectoral tank, inducing compression at this latter face.

Another feature of this invention is the provision of valve-controlled apertures on the opposite faces of a sectoral tank, one set of the apertures permitting the flow of compressed gases into the sectoral tank, the other set for optional use to permit egress of the compressed gases from the sectoral tank into an expansion or cooling chamber.

Yet another feature of this invention is to provide a special timing and actuating device for the oscillatory free plate which consists essentially of an eccentrically rotatable arm connected to said free plate which is engageable with a rotatable mass considerably heavier than the combined mass of the arm and the associated free plate. In the rotation of said timing device, the arm begins to actuate the rotatable mass at the point of contact farthest from the center of the rotatable mass and may continue to actuate said mass until a point of contact is reached radially nearest to the center of the rotatable mass from which point the rotatable mass actuates the arm. During the cycle when the arm actuates the rotatable mass, the oscillatory free plate is being decelerated by giving up energy to said arm; when the rotatable mass actuates the arm, the oscillatory free plate is being accelerated by receiving energy from the accelerated rotatable mass. During the phase of operation when the oscillatory free plate is being decelerated, the free plate is receding relative to a given face of a sectoral tank; during the phase of operation when the free plate is being accelerated, the free plate is relatively approaching the same face of said sectoral tank. It is, of course, understood that the rotatable mass hereinabove mentioned may take several forms, such as a fluid mass, or a solid rotary tank having an internal radial slot or an external radially disposed channel.

Another feature of this invention is to introduce a gas into a rotary or agitation zone, providing a plurality of separate diametrically disposed sectoral zones within said rotary zone and rotatable with the latter, spraying a liquid into said zone, rotating said rotary and sectoral zones whereby the gas is caused to follow a generally spiral path from a low pressure to a high pressure area within said rotary zone and whereby the liquid is caused to move in an increasing spiral path outwardly toward the ends of said rotary zone, and subjecting the gas to an additional oscillatory movement to and from said sectoral zones as the sectoral zones are rotated. As the gases move toward the sectoral zone, compression is effected and the gases may be let into said sectoral zone and withdrawn therefrom as compressed gas. As the gas is moved away from the sectoral zone, decompression or suction is effected. Obviously, a compression zone may be alternately a decompression zone, and vice versa. The compressed gases may be led out of the sectoral zone during this decompression phase of operation into an expansion zone whereby cooling or refrigeration is effected. The liquid which has been introduced to absorb heat of compression may be let out of the rotary zone by the combined action of centrifugal force and the pressure applied to introduce the liquid into said rotary zone. The additional oscillatory movement imparted to the swirling gas may be synchronized in such manner that as many compression and expansion phases may be imparted to the gas through every unit of rotation of said rotary zone as there are sectoral zones.

The particular timing and actuating mechanism shown permits only two compression and two expansion phases per unit of rotation. However, with the jet method of introducing a coolant, which provides initiating impetus to the acceleration of certain masses which are considerably lighter weight than the other masses of the system, adequate and properly adjusted force of the jets applied only in one of any several units of rotation, may synchronize the phases to cause repetition any reasonable number of times per unit of rotation. The force of the jets would only initiate and renew the oscillatory variations of the inertias of the masses. Exchanges of kinetic energies synchronized with compression and expansion phases would continue the oscillatory action and the resultant synchronization would become semi-automatic and semi-independent, needing only renewal reversal impulses from the jets. Thus, any other number of phase repetitions per unit of rotation may be imparted to the gas, irrespective of the number of sectoral zones.

These, together with various ancillary objects and features of the invention which will latter become apparent as the following description proceeds, are attained by the device, a preferred embodiment of which has been illustrated, by way of example only, in the accompanying drawings, wherein:

Reference will now be made to the drawings. In the several views in the accompanying drawings and in the following specification, similar reference characters indicate corresponding elements throughout.

Generally indicated at 10 is the compressor and expander of the instant invention which consists of a stator tank 12 having side walls 14 and 16 provided with a pair of aligned axial bores 18 and 20. To the side wall 14 is removably attached a gas inlet conduit 22, while to the side wall 16 is removably attached a valve-controlled compressed gas outlet conduit 24. Suitably and removably secured tangentially at any desired point at the bottom of the stator 12 is a liquid exit conduit 26.

Secured to the side wall 14 about the bore 18 is a suitable bearing 28 which is provided with the conventional races 30 and ball bearings therein 32. It is to be understood that bearings of any suitable type, such as needle, roller, or other bearings, may be optionally substituted for the ball bearings shown.

Rotatably positioned within the stator tank is a plurality of diametrically opposed, high-pressure gas storage sectoral tanks 34, two being shown for illustrative purposes, each sectoral tank consisting of a pair of radially extending side members 36 and 38. In the modification shown in Figures 1 and 2, the sectoral tanks are provided with an outer continuous cylindrical cover 40 and side plates 42 and 44. Also in the modification shown in Figures 1 and 2, each sectoral tank is provided with a partition plate 46, which is welded or otherwise secured to the radial members 36 and 38, preferably positioned adjacent the apex of the sectoral tank. Fixedly secured to the side plate 44 of the sectoral tank is a hub 48 which is integral with or fixedly secured to a drive shaft 50, upon which is secured a conventional pulley 52. Secured to the side plate 16 of the stator about the axial bore 20 and the shaft 50 is a suitable bearing 54 provided with the conventional ball bearings and races.

Figure 14:
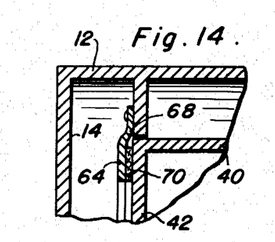
Figure 14 is a fragmentary longitudinal sectional view of a form of a packing gland between the stator tank and the rotary sectoral tanks shown in Figure 2.
Figure 15:
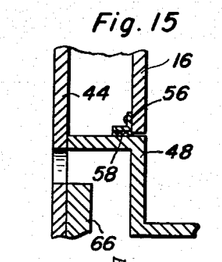
Figure 15 is a fragmentary longitudinal sectional view of a form of a packing gland between the stator tank and the drive shaft shown in Figure 2.

Secured to the side member 16 of the stator is an annular angle iron 56, the bottom lug of which is separated from the hub 48 by means of a suitable packing gland 58 to prevent leakage of compressed gas between the hub and the side plate 16. Depending from the inner walls of the stator 12 is a pair of spaced annular rims 60 and 62, the free edges of which are spaced from the cover plate 40. Suitably secured to each of the rims 60 and 62 are a pair of generally circular plates 64 and 66 having central apertures which are somewhat angulated, as at 68. Suitable packing glands 70 are positioned between the circular plates and the side walls of the sectoral tanks, as shown in Figure 14, to provide a desired gas tight seal.

The area defined by the side wall 14 of the stator and the side wall 42 of the sectoral tank, designated generally by the numeral 72, is equivalent to a low pressure gas chamber, while the area defined by the side member 16 of the stator and the side wall 44 of the sectoral tank, generally designated by the numeral 74, is equivalent to a high pressure or compressed gas chamber.

Figure 1:
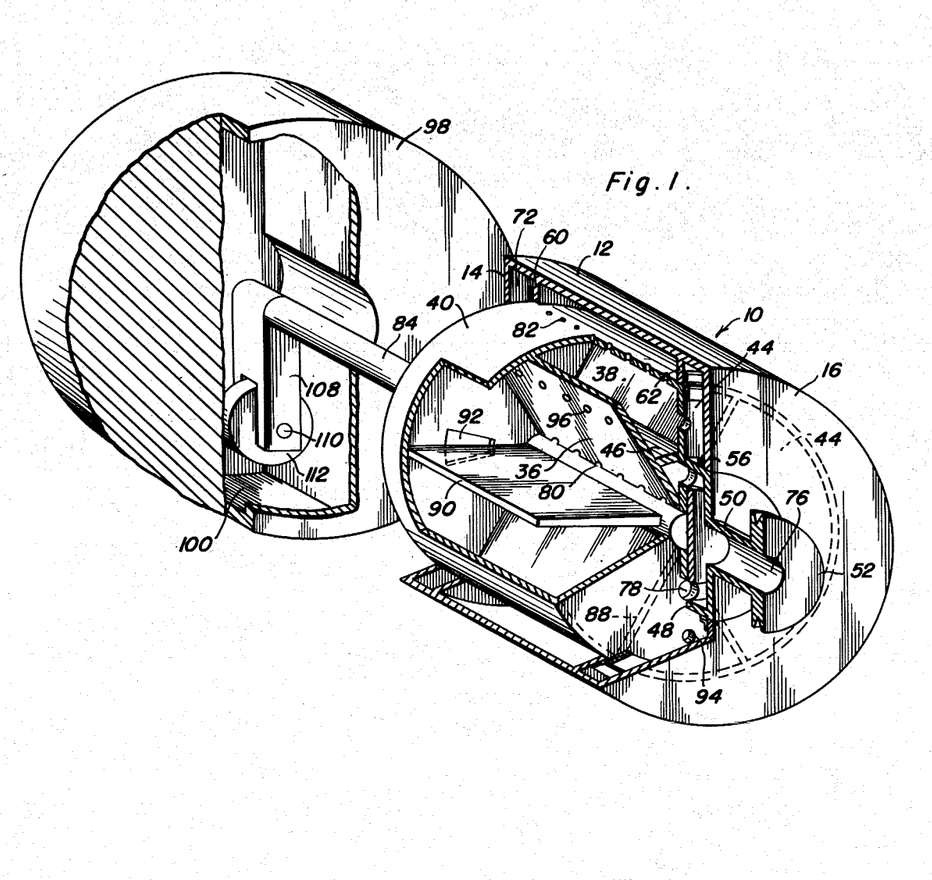
Figure 1 is a perspective view, parts broken away, of the compressor and expander of the instant invention with an associated timing and actuating mechanism.
Figure 2:
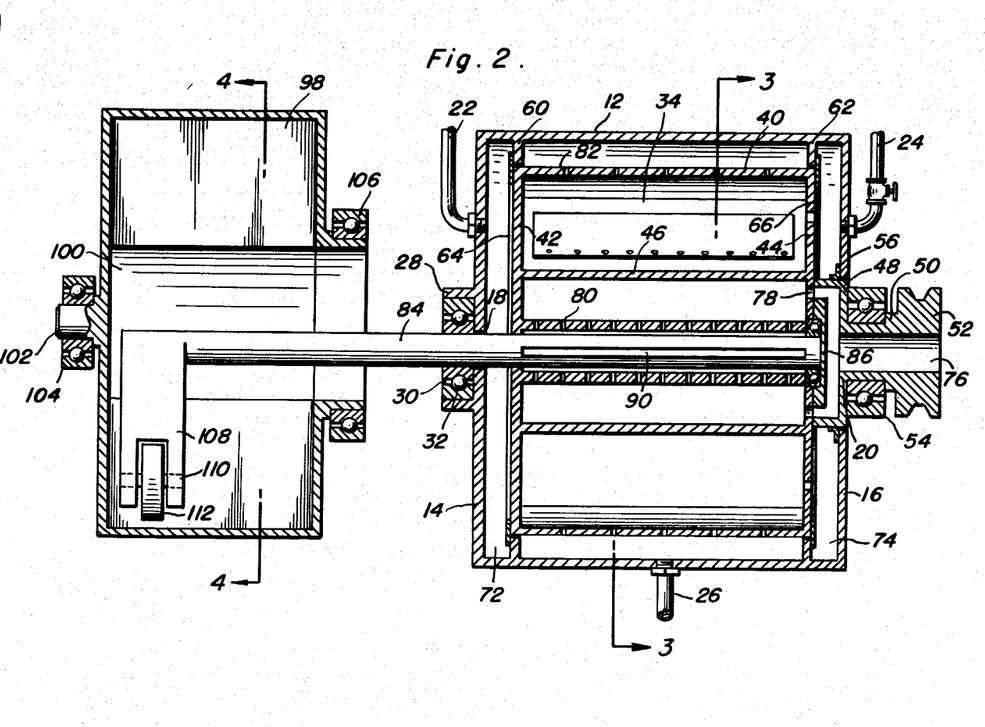
Figure 2 is a longitudinal sectional view of the device shown in Figure 1.

In the modifications shown in Figures 1 and 2, the shaft 50 is provided with an axial bore 76 which is communicative with a series of circumferential apertures 78 provided at the bottom of the side walls 44 of the sectoral tanks and communicative with the interior of the sectoral tanks between the partitions 46 and the apices of the tanks. A cooling liquid, such as water, may be introduced through the axial bore 76 in the shaft under a certain predetermined pressure and will be led into the bottom of the sectoral tank. As the sectoral tanks are rotated by the shaft, the cooling liquid will be subjected to a centrifugal force and will cross the path of the inflowing gases to be compressed. To allow for an egress of the cooling liquid, a series of axially disposed small apertures 80 are provided, substantially at the apex of each sectoral tank, through which the cooling liquid will flow and eventually leave the stator tank through the exit conduit 26. More specifically, liquid fluid gets to outlet 26 from openings 80 by passing from openings 80 into the volume of gases which are being compressed and expanded, the liquid then being centrifugally removed as gases rotate, this liquid then passing through openings 82 and 83 in wall 40, with centrifugal action accelerating it to pump it through conduit 26. Gaseous fluids entering at 22 crosses the path of liquid entering at 76 thusly: Gases from 22 are admitted through openings 92 into semi sectorial spaces between opposing faces of high-pressure semi sectorial tanks; liquid entering at 76, under applied pumping pressure, is forced through openings 78 and 80, and from 80 into the volume of gases coming from 22. Liquids entering at 78 get into apertures 80 either by virtue of the centrifugal force to which it is subjected by the rotating system, or by that force plus externally applied pumping pressure. Centrifugal force is applicable upon the liquids because apertures 80 are on lines somewhat removed by some significant distances from axis of rotation. In the event that some of this liquid will work its way into the upper portion of the sectoral tanks, the cover plate 40 will also be provided with a series of axially disposed small openings 82 positioned between the side members 36 and 38 of the sectoral tanks, and the liquid leaving these apertures would eventually work its way to the bottom of the stator tank and leave through the exit conduit 26. Liquid may also pass through optional apertures, not shown, through partition members 46 and thus, by centrifugal action, flow across compressed gases in the sectional tanks. Aditional apertures 83 are provided in the plate 40 communicative with the low pressure chambers for the additional removal of water therefrom.

Extending through the stator, but not directly connected to the drive shaft 50, is a driven shaft 84 which passes through the journal 28 and which, at one extremity, engages a suitable journal bearing 86 which is secured to the side wall 44 of the sectoral tanks. Suitably secured to the driven shaft 84 and positioned within the stator tank intermediate the radial wall 36 of a sectoral tank and a radial wall 88 of another diametrically disposed sectoral tank, is an oscillatory free plate 90. It is to be understood that this oscillatory free plate may be secured to the driven shaft 84 by positioning them within axial slots on the driven shaft or by any other suitable means.

The side wall 42 is also provided with a plurality of gas intake apertures 92, preferably sectoral in shape, which are positioned midway between (or at the low pressure point), a radial wall 36 of one sectoral tank and a radial wall 88 of another diametrically opposed sectoral tank. The side plates 44 are also provided with gas outlet apertures 94 positioned intermediate the radial walls 36 and 38 of the sectoral tanks and communicated with the interior of said tanks. The wall 36 of each sectoral tank is further provided with a series of axially aligned apertures 96 adjacent the top edge of the side member 36. Thus, gas to be compressed will be let in through the conduit 22, will pass through the aperture 92, will be compressed into and through the apertures 96, will pass out of the interior of the sectoral tank through the apertures 94 into the compressed gas chamber 74 and out through the gas exit conduit 24 for use as compressed gas.

Adjacent the stator 12, a rotatable, preferably cylindrical, mass 98 is provided. This mass 98 is further provided with an axial slot 100 and is supported at its rear end upon a stub shaft 102 and rotatable within a suitable ball bearing journal 104. Similar ball bearing journals 106 are provided at the forward end of the rotatable mass 98.

The driven shaft 84 extends into the rotatable mass 98 through the slot 100 and is provided at the extremity extending into the rotatable mass with an integral bifurcated member 108 between the furcations of which is rotatably secured, as at 110, a small wheel or balled bearing 112. The driven shaft 84 is eccentrically mounted within the rotatable mass 98, as shown more clearly in Figure 4. The entire device constitutes the timing and oscillatory plate actuating device. It should be noted at this point that the rotatable mass 98 is considerably greater in weight than the combined mass of the oscillatory free plate 90, the driven shaft 84, the bifurcated member 108, and the small wheel 112. For optimum results, this ratio of masses should be substantially within the range of four to one on up to ten to one.

Figures 7, 8, 9, 10, 11, 12:
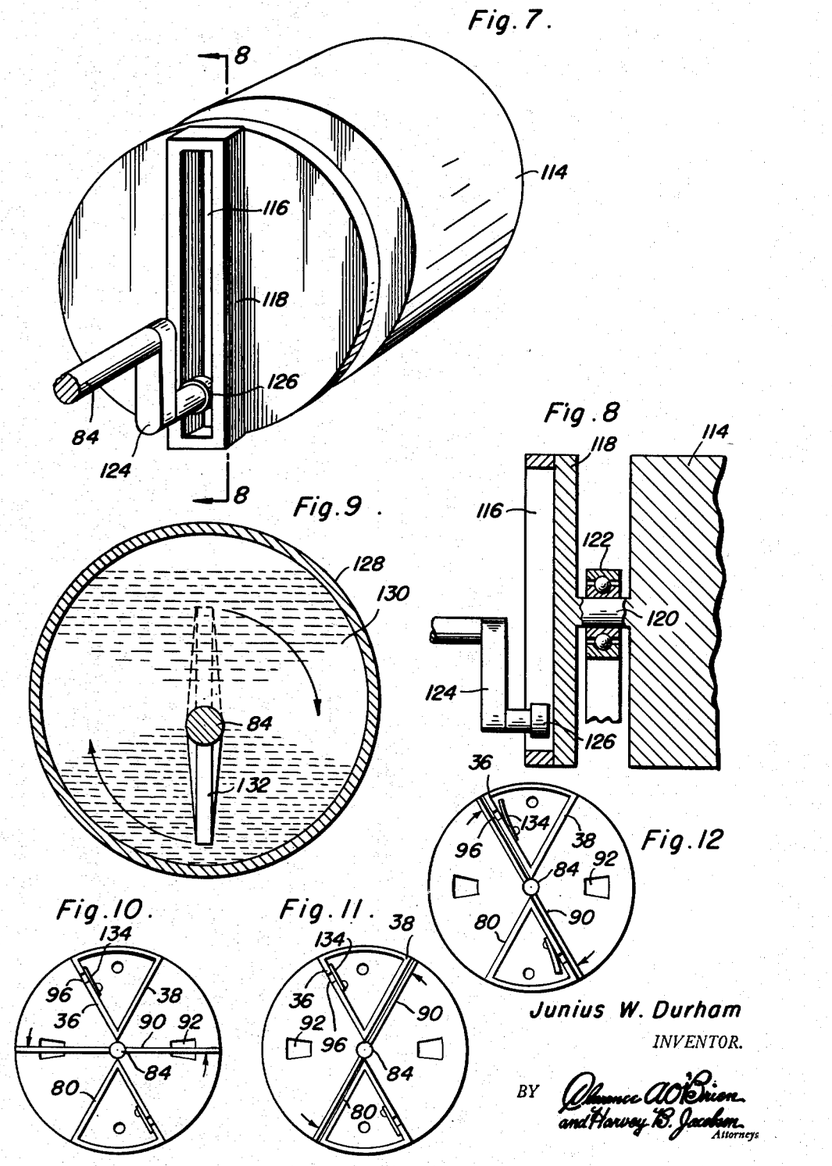
Figure 7 is a fragmentary perspective view of one modification of the timing device.
Figure 8 is a vertical sectional view taken substantially on the plane of section line 8—8 of Figure 7.
Figure 9 is a transverse vertical sectional view of a second, or fluid mass, modification of the timing device.
Figure 10 is a diagrammatic view showing the oscillatory free plate in the low pressure position, the pressure being equalized on both sides of the plate.
Figure 11 is another diagrammatic view showing the oscillatory free plate at the end of the decompression stroke.
Figure 12 is another diagrammatic view showing the oscillatory free plate at the end of the compression stroke.

In Figures 7 to 9, two further modifications of this timing and actuating device are shown. In the modification shown in Figures 7 and 8, the driven shaft 84 is again eccentrically positioned relative to the center of the rotatable mass 114, which, in this case, is a solid mass. Instead of an axial slot being disposed internally within the rotatable mass, an external slot 116 may be provided defined by a substantially rectangular guideway or frame 118 which is secured to the rotatable mass 114 by means of a stub shaft 120 about which is provided a suitable ball bearing journal 122. To the extremity of the driven shaft 84 is secured a substantially L-shaped member 124, to the horizontal leg of which is further secured a preferably knurled collar or balled bearing 126 which rides in the slot 116 during rotation. The collar 126 is broadly equivalent to the small wheel 112 shown in Figures 1 and 2.

In the modification shown in Figure 9, the rotatable mass consists of a hollow cylinder 128 which is filled with a fluid mass 130, which fluid may be a gas or a liquid. The driven shaft 84 is again eccentrically positioned within the rotatable mass relative to the center of the mass and carries a fin 132.

During the approximate half-cycle of operation when fin 132 is moving from the rotational angle at which the said fin 132 is least immersed in the rotating fluid mass 132, on around to the angle 180° later when said fin 132 is most deeply immersed in fluid mass 130, the portion of fluid mass 130 which is proximate to the fin 132 is moving with greater lineal velocity than any proximate particle of mass of fin 132. Therefore, the fluid mass is accelerating (the lineal and angular velocity of) fin 132, and thereby is accelerating the oscillatory free plates 90 which are attached to the shaft 84 to which fin 132 is also attached, during the approximate half-cycle of rotation. In the succeeding half-cycle, the fin 132 having been accelerated will now accelerate the fluid mass 130 as it moves from the angle of rotation at which said fin 132 is most deeply immersed in the fluid mass 130 around through 180 degrees of rotation to the angle at which fin 132 is least immersed in the fluid mass, of any point of rotation.

Any conventional clutch modification may optionally be used to engage or disengage any portion or all of any of the rotatable mass 98, in order to vary the angle through which the oscillatory free plates 90 oscillate, or to permit the expansive force of a residue of gases from each compression phase to provide more nearly all of the power for enforcing the oscillatory movements of the free plates 90.

Figures 3, 4, 16:
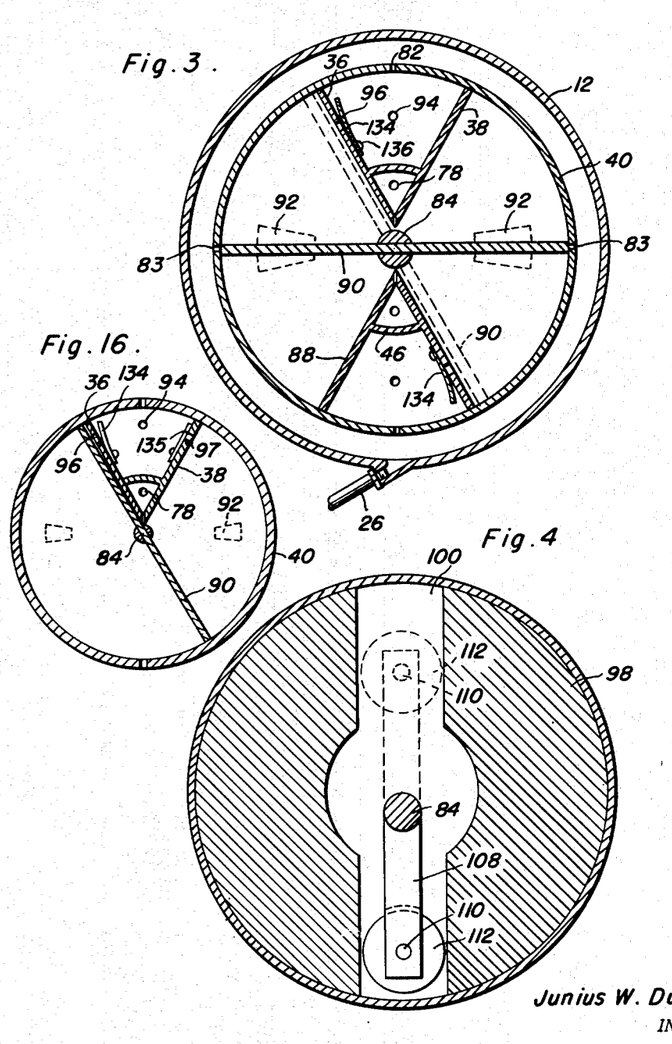
Figure 3 is a transverse vertical sectional view through the compressor and expander taken substantially on the plane of section line 3—3 of Figure 2.
Figure 4 is a transverse vertical sectional view through a modification of the compressor and expander in which cooling liquid is introduced by means of jets.
Figure 16 is a sectional view of a further modification of the compressor-expander of the instant invention.

As shown in Figure 3, when the device of the instant invention is employed solely as a compressor, it is advisable to provide a valve control means communicative with the apertures 96 leading into the sectoral tank to allow for the flow of compressed gases to the interior of the sectoral tank, and at the same time to substantially retard the flow of the compressed gases out of the interior of the sectoral tanks through the same apertures 96. While a number of different valves may be employed, such as one-way spring check valves to be positioned within the apertures 96, a preferred valve construction is shown in Figure 3. This consists of a flexible leaf spring 134 which is disposed within the sectoral tank and secured to the inner wall of the radial member 36, as at 136, across the member 36 and directly behind the apertures 96. Thus, upon the compression stroke, as the oscillatory free plate 90 approaches the outer face of the member 36, the gas is compressed and forced through the apertures 96, flexing the leaf spring 134 in the direction of the center of the sectoral tanks, allowing ingress of the compressed gases into the interior of the sectoral tanks themselves. The pressure of the compressed gases in the sectoral tanks will substantially close the leaf spring valve 134, preventing egress of the compressed gases through the same apertures 96, and thus allowing egress of the compressed gases only through the apertures 94 provided therefor.

Figures 5, 13:
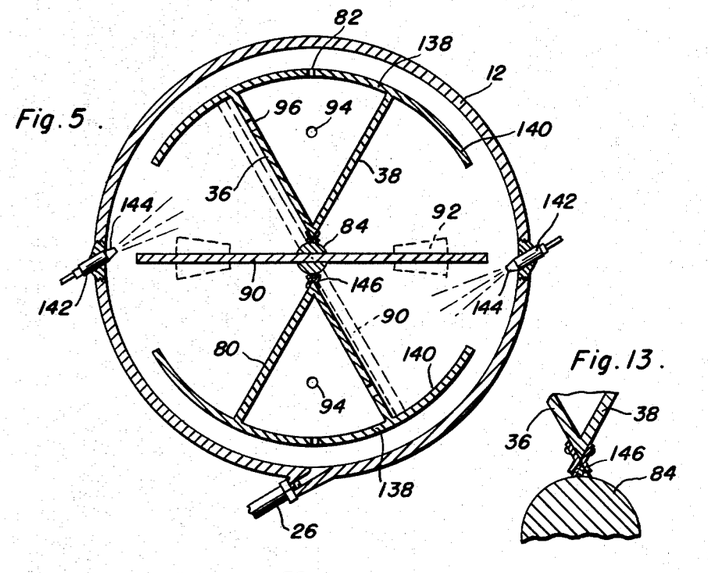
Figure 5 is a transverse vertical sectional view through a modification of the compressor and expander in which cooling liquid is introduced by means of jets.
Figure 13 is a fragmentary vertical sectional view of the apex of the sectoral tank shown in Figure 5 and a portion of the shaft and a suitable packing gland between the sectoral tank and the shaft.

In Figure 5, another modification of the compressor is shown in which the cooling liquid is introduced into the stator tank directly and not through a bore in the drive shaft as shown in Figure 1. Instead of providing a continuous cylindrical wall around the sectoral tank, a discontinuous wall 138 is provided about each sectoral tank having overlapping eave members 140. Tangentially secured to the stator 12 at various positions intermediate the discontinuous cylindrical cover 138, a plurality of jets 142 are provided having reduced nozzle portions 144 through which cooling liquid may be introduced into the interior of the stator in the form of fine sprays. It will be readily seen that in this position the cooling liquid will be introduced across the path of the moving masses within the stator tank for optimum cooling of the masses and subsequent absorption of the heat of compression produced therein. As shown in Figure 5, the temporary position of the members in rotation is such that jets 142 at this instant are intermediate the eaves 140. But since these jets 142 are fixed in position to the stator 12, while the combination of sectoral tanks and free plates are rotating, the intermediate positioning of the jets 142 occurs only for a fraction of time of each rotary cycle. A desired result is that substantially all portions of the working volume of gases could thereby be brought to pass beneath the spray from the jets, and even a solid stream of liquid input would effectually be sprayed because the gases simply rapidly pass beneath the stream, so that infinitesimally small particles of liquid would be "caught" by different particles of gas masses. To prevent substantial leakage of compressed gases around the driven shaft 84 between the shaft 84 and the apices of the sectoral tanks, suitable axially disposed, generally V-shaped angle irons 146 are secured to the side members 36 and 38 of the sectoral tanks at the apices thereof and disposed intermediate the driven shaft 84 and the sectoral tanks. The jets used in the modification shown in Figure 5 serve an additional major purpose beyond that of liquid spray: The force of the jets at spaced intervals may be made sufficiently powerful to give great acceleration to the oscillatory free plates 90 during one unit of rotation only among many units of rotation, merely to provide at such intervals a sudden and powerful impetus to initiate the oscillatory movements of the oscillatory free plates 90, at the start of operation, and thereafter to renew the distinctly oscillatory movements, in event of some cessation of the movement resulting from improper gas pressures (inadequate) remaining after each compression stroke, when a residue of compressed gases must be left outside the high-pressure sectoral tanks in order to regenerate each oscillatory movement in each half-cycle of oscillation. Once having been initiated, the alternate acceleration and deceleration of the oscillatory free plates or blades 90 will be made substantially self-sustaining by aid of expansion of said residue of compressed gases remaining, both on the accelerated and the decelerated movement of plates 90.

Figure 6:
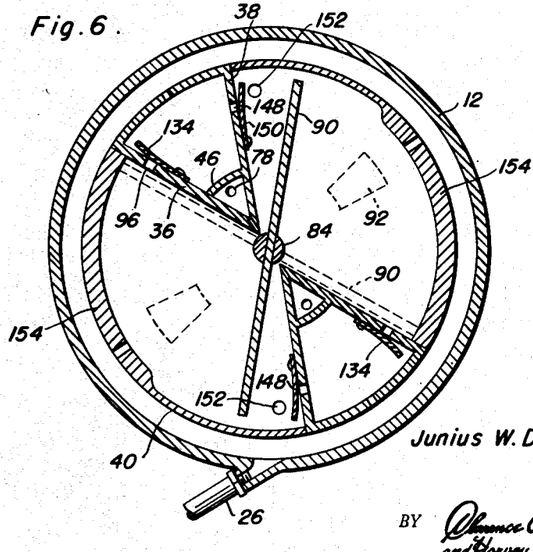
Figure 6 is a transverse vertical sectional view through the compressor and expander showing a further modification of the compressor and expander.

In Figure 6, a third modification of the compressor and expander is illustrated. It will also be noted that Figure 6 discloses structural elements which are preferably employed when the device is used both as a compressor and an expander or refrigerator. To accomplish this second phase of expansion or refrigeration, a series of axially disposed apertures 148 are provided in the side member 38 of each sectoral tank, which apertures are similar to the apertures 96 provided in the side members 36. To the outer face of the side member 38 and across said face adjacent the apertures 148 is secured a leaf spring valve 150 similar in construction and design to the leaf spring valve 134. Thus, on the compression stroke, compressed gas will be forced through the apertures 96 to the interior of the sectoral tanks and instead of being withdrawn as compressed gas from the sectoral tanks for use elsewhere, the compressed gases will pass through the apertures 148 and flex the leaf spring valve 150 in a direction away from the wall 38 of the sectoral tank. The compressed gases thus leaving the sectoral tank through the apertures 148 will rapidly expand into an expansion chamber, causing considerable cooling of the gases and, hence, refrigeration. The cooled or refrigerated gases may then be withdrawn through suitable apertures 152 and used as such in well-known refrigerating devices. At this point it is to be distinctly understood that this combination of leaf spring valves 134 and 150 may readily be employed in any of the modifications hereinabove discussed and set forth whenever it is desired that the device of the instant invention be used both as a compressor and expander or refrigerator. In addition, Figure 6 discloses another modification. The cylindrical wall 40 which is disposed about the sectoral tanks is provided with a plurality of shoulders 154 to allow for greater efficiency of compression of the gases introduced into the stator tank, since the oscillatory free plate 90 will just clear the shoulders 154.

In Figure 16, a further modification of the expander-compressor is shown comprising a single sectoral tank, the radially extending wall 36 of which is provided with apertures 96, while the other radially extending wall 38 is also provided with apertures 97. To the inner surface of the wall 36 is secured a leaf spring valve 134, while to the inner surface of the wall 38 is secured a similar leaf spring valve 135. Thus, as the free plate 90 approaches the wall 36, gas is compressed and forced through the apertures 96, opening the valve 134 and closing the valve 135. On the reverse stroke, as the free plate 90 approaches the wall 38, gas is compressed and forced through the apertures 97, opening the valve 135 and closing the valve 134.

In Figures 10, 11 and 12, the various strokes or phases of movement of the oscillatory free plate relative to the sectoral tanks are diagrammatically set forth. Figure 10 discloses the oscillatory free plate at an intermediate or low pressure point. Figure 11 discloses the oscillatory free plate 90 at the end of the decompression stroke, while Figure 12 discloses the oscillatory free plate 90 at the end of its compression stroke.

In practical operation, the device of the instant invention functions in the following manner. The drive shaft is actuated via the pulley secured thereon, thus causing the sectoral tanks to rotate within the stator tank at a substantially constant velocity. The sectoral tanks, in the first phase of operation, move up to and about the oscillatory free plate and impart rotary movement in the same direction to said oscillatory free plate. This rotary movement may be largely imparted to the oscillatory free plates or blades 90 by means of the force of gases which are suddenly compressed by the approach of the faces of radial members of the high pressure sectoral tanks; little of the rotary movement need be imparted by actual physical contact, if movement is fast enough to cause moderately quick compression of intervening gases between the faces of radial members and the free plates. As a result, the oscillatory free plate drives the shaft 84, which in turn rotates the bifurcated element 108 and associated wheel 112 (or the fin 132 or the L-shaped member 124), which in turn causes the rotatable mass 98 (or mass 114, or mass 130) to rotate in the same direction. In imparting this rotary motion to the rotatable mass, obviously the oscillatory free plate itself loses energy and becomes decelerated. Because of the eccentric disposition of the driven shaft 84 with reference to the center of mass of the rotatable mass, after one-half cycle of rotation, the rotatable mass has become accelerated at the end of this phase, and consequently instead of being driven, begins to drive the roller 112. The roller 112 is therefore accelerated and so is the oscillatory free plate. Thus, while the oscillatory free plate rotates in the same general direction as the sectoral tanks, in this phase of operation its velocity is greater than the velocity of the sectoral tanks. Also, in this phase of operation, while the gases are being led into the stator tank, the oscillatory free plate is moving toward the side member 36 of a sectoral tank, compressing the gases therebetween. This is, of course, the compression stage. In some modifications, compression is effected in both the forward and reverse movements of the oscillatory free plates 90. Also, the oscillatory free plate is losing energy while imparting compression to the gases and becomes somewhat decelerated. At the end of this compression stroke, the second cycle of the timing device is approached, in which the driven shaft 84 begins again to drive the rotatable mass, thus causing a loss of energy or a deceleration in the oscillatory free plate. The oscillatory free plate is therefore slowed up relative to the rotary velocity of the sectoral tanks, and consequently moves away from the side member 36 of the sectoral tanks. This second phase of the operation is known as the decompression stage and also causes suction at the aperture 92 to actuate the intake of gas therethrough. Thus, it is seen that three independently rotatable systems are provided in which the oscillatory free plate becomes cyclically decelerated and accelerated in synchronization with the decompression and compression phases in the compressor. The term "oscillatory free plate" of course refers to the oscillation of the free plate with relation to the direction of rotation of the sectoral tanks, although the oscillatory free plate and the sectoral tanks as well as the rotatable mass are all rotating in the same general direction.

To absorb the heat of compression produced in the compressor, cooling liquid is introduced, in the several ways shown and described above, wherein a fine spray of this cooling liquid is rotated together with the rotatable masses within the stator tank to produce optimum cooling effects. The combined pressure at which the cooling liquid is introduced into the compressor and the centrifugal force applied to the cooling liquid cause this liquid to be withdrawn from the stator tank. In the expansion or refrigeration phase of operation, the compressed gases which have been forced into the sectoral tanks are also forced out of these tanks past the valve 150 into the adjacent space between the outer walls of the diametrically opposed sectoral tanks, which space is equivalent to an expansion chamber. During the decompression stage, as the oscillatory free plate is decelerated, it will be seen that the one-way check valve 150 will not allow the cooled expanded gases to re-enter the sectoral tanks, but rather to be forced out of an aperture 152 and led away to other devices of a refrigerating nature. If air is employed as a direct refrigerant, this invention becomes a complete and independent air-conditioning device supplying refrigerated air to refrigerator boxes, residences, and other buildings.

It should be understood that for application of invention for use as a rotary internal combustion engine, the intake of fuel may be by the same paths or channels as intake of cooling liquid or coolant, and that furthermore the fuel may be vaporized and mixed (dispersed) with air within the plurality of sectoral chambers by the same sort of escape of burning compressed gases upon the compression strokes of the oscillatory free plates. No major modifications will be essential, other than perhaps some form of lining for the protection of some or all of the members from excessive heat, such as asbestos coating, etc., and perhaps a channel parallel to the liquid intake channel for bringing some gases such as air to mix with the fuel at apices of the sectoral tanks or at other point of conjunction of fuel and gases. It should be stated, however, that either gases, fuel or liquid may also be drawn into or forced into the various low-pressure and high-pressure sectoral chambers by other channels through axial bores in shaft 84 and through channels within the oscillatory free plates leading to apertures therein, or by any other channels of any shaft and/or other members.

It should be clearly understood that fully within the scope and comprehension of this invention, we could substitute another set of "free" plates about an independent and separate shaft of which one extremity is in operative engagement with another independently rotatable mass similar to mass 98 (or 114 or 130) in lieu of the combination of sectoral tanks which are rotatable. We would then have variable action or delivery without having the side walls 42 and 44 to rotate and without cover 40 rotating. Furthermore, this duplicate rotatable mass similar to mass 98 (or 114 or 130) may be directly power-driven in lieu of power drive to the combination of sectoral tanks, and through its operative engagement provide the transmission of all power to the remaining members and elements of the invention.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a compressor, a stator tank, a driven shaft rotatably mounted in said tank and passing through the longitudinal axis thereof, diametrically opposed sectoral tanks circumferentially spaced about said shaft and disposed within said stator tank and rotatable as a unit independently of and about said shaft, means for rotating said sectoral tanks at a substantially constant speed, radial plates secured to said shaft and disposed in the spaces between said sectoral tanks, means for admitting gas intermittently to the spaces between said plates and the adjacent sectoral tanks, means whereby gas under pressure in said spaces may be admitted to said tanks, means to accelerate and decelerate the rotary movements of said shaft at predetermined times, and means whereby gas within said sectoral tanks may be discharged therefrom.

2. In a compressor, a stator tank, a driven shaft rotatably mounted in said tank and passing through the longitudinal axis thereof, diametrically opposed sectoral tanks circumferentially spaced about said shaft and disposed within said stator tank and rotatable as a unit independently of and about said shaft, means for rotating said sectoral tanks, radial plates secured to said shaft and disposed in the spaces between said sectoral tanks, means for admitting gas intermittently to the spaces between said plates and the adjacent sectoral tanks, means whereby gas under pressure may pass from said spaces to said tanks, means for varying the speed of rotation of said shaft with respect to the rotary speed of said sectoral tanks, and means whereby gas within said sectoral tanks may be discharged therefrom.

3. In a compressor, a stator tank, a driven shaft rotatably mounted in said tank and disposed in the longitudinal axis thereof, diametrically opposed spaced apart sectoral tanks circumferentially spaced about said shaft and disposed within said chamber rotatable as a unit independently of and about said shaft, means for rotating said tanks in the same rotative direction as said driven shaft, plates secured to said shaft and projecting radially therefrom into the spaces between said tanks, valve means operable at predetermined times to admit gas between the trailing and advancing faces respectively of said plates and sectoral tanks, means whereby gas between said faces may be admitted to said sectoral tanks, gas outlet means in said sectoral tanks, a rotatable means having a substantial mass, bearing means rotatably supporting said rotatable means, and means whereby said rotatable means is rotated by said shaft until the speed of rotation of said rotatable means exceeds the speed of rotation of said shaft, after which said shaft is rotated by said rotatable means.

References Cited in the file of this patent

UNITED STATES PATENTS

| Number | Name | Date |
|---|---|---|
| 983,605 | Cole | Feb. 7, 1911 |
| 1,508,522 | Lundgaard | Sept. 16, 1924 |
| 1,720,577 | Stern | July 9, 1929 |
| 1,889,508 | Zens | Nov. 29, 1932 |
| 2,073,833 | Bothezat | Mar. 16, 1937 |
| 2,328,439 | Esnault-Pelterie | Aug. 31, 1943 |
| 2,346,014 | Downey | Apr. 4, 1944 |
| 2,453,271 | Sales | Nov. 9, 1948 |

FOREIGN PATENTS

| Number | Country | Date |
|---|---|---|
| 10,538 | Great Britain | of 1910 |
| 90,551 | Germany | Feb. 19, 1897 |
| 132,015 | Great Britain | Sept. 1, 1919 |
| 421,041 | Great Britain | Dec. 12, 1934 |
| 497,630 | Great Britain | Dec. 22, 1938 |